(12) United States Patent
Liao

(10) Patent No.: US 10,234,711 B2
(45) Date of Patent: Mar. 19, 2019

(54) TOUCH DISPLAY DEVICE AND METHOD FOR MANUFACTURING THE SAME

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventor: Xiaogang Liao, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/666,630

(22) Filed: Aug. 2, 2017

(65) Prior Publication Data

US 2018/0039129 A1 Feb. 8, 2018

(30) Foreign Application Priority Data

Aug. 4, 2016 (CN) .......................... 2016 1 0632721

(51) Int. Cl.
*G06F 3/041* (2006.01)
*G02F 1/1333* (2006.01)

(52) U.S. Cl.
CPC .... *G02F 1/133382* (2013.01); *G02F 1/13338* (2013.01); *G06F 3/0412* (2013.01); *G02F 2001/133334* (2013.01); *G06F 2203/04103* (2013.01); *G06F 2203/04107* (2013.01)

(58) Field of Classification Search
CPC ........... G02F 1/13338; G02F 1/133382; G02F 2001/133334; G02F 2201/50; G06F 2203/04103; G06F 2203/04107; G06F 3/0412
See application file for complete search history.

(56) References Cited

U.S. PATENT DOCUMENTS

| 4,621,261 A * | 11/1986 | Hehlen ................ G09G 3/3603 340/14.6 |
| 4,723,835 A * | 2/1988 | Franklin ............ G05D 23/1909 219/209 |
| 6,309,100 B1 * | 10/2001 | Lutnaes ............... G01K 11/165 349/12 |

(Continued)

FOREIGN PATENT DOCUMENTS

| CN | 105182585 A | 12/2015 |
| CN | 105629553 A | 6/2016 |

OTHER PUBLICATIONS

First Office Action for Chinese Patent Application No. 201610632721.3 dated Sep. 26, 2018.

*Primary Examiner* — Michael J Jansen, II
(74) *Attorney, Agent, or Firm* — Calfee, Halter & Griswold LLP

(57) ABSTRACT

A touch display device includes a first substrate and a second substrate disposed opposite to each other, wherein a touch functional layer and a conductive layer are insulated from each other and are disposed on the second substrate. The conductive layer is disposed between the touch function layer and the first substrate; and the conductive layer serves as a heating layer in a first state and serves as a shield layer in a second state.

16 Claims, 2 Drawing Sheets

(56) References Cited

U.S. PATENT DOCUMENTS

| Patent/Publication | Date | Inventor | Classification |
|---|---|---|---|
| 6,891,129 B2* | 5/2005 | Pala | G02F 1/133382 219/209 |
| 6,891,135 B2* | 5/2005 | Pala | G02F 1/133382 219/209 |
| 6,933,991 B2* | 8/2005 | Sanelle | G02F 1/13338 349/158 |
| 7,259,809 B2* | 8/2007 | Brandt | G06F 3/041 345/173 |
| 7,265,809 B2* | 9/2007 | Dunn | G02F 1/133308 349/111 |
| 7,633,583 B2* | 12/2009 | Wang | G02F 1/133555 349/117 |
| 8,009,262 B2* | 8/2011 | Dunn | G02F 1/133382 349/161 |
| 8,212,983 B2* | 7/2012 | Sugita | G02F 1/1345 349/139 |
| 8,368,866 B2* | 2/2013 | Lee | G02F 1/134363 257/59 |
| 9,213,450 B2* | 12/2015 | Ippel | G06F 3/044 |
| 9,715,299 B2* | 7/2017 | Tanaka | G06F 3/0412 |
| 9,910,552 B2* | 3/2018 | Shiojiri | G06F 3/041 |
| 9,964,792 B2* | 5/2018 | Liu | G02F 1/13338 |
| 2002/0033919 A1* | 3/2002 | Sanelle | G02F 1/13338 349/122 |
| 2004/0075786 A1* | 4/2004 | Brandt | G06F 3/041 349/58 |
| 2004/0112889 A1* | 6/2004 | Pala | G02F 1/133382 219/494 |
| 2004/0182851 A1* | 9/2004 | Pala | G02F 1/133382 219/494 |
| 2005/0073640 A1* | 4/2005 | Dunn | G02F 1/133308 349/161 |
| 2006/0139501 A1* | 6/2006 | Lee | G02F 1/133382 349/21 |
| 2006/0262258 A1* | 11/2006 | Wang | G02F 1/133555 349/117 |
| 2007/0298253 A1* | 12/2007 | Hata | B82Y 10/00 428/339 |
| 2008/0291386 A1* | 11/2008 | Dunn | G02F 1/133382 349/161 |
| 2008/0309865 A1* | 12/2008 | Sugita | G02F 1/133382 349/150 |
| 2010/0123675 A1* | 5/2010 | Ippel | G06F 3/044 345/173 |
| 2012/0292304 A1* | 11/2012 | Burchard | G05D 23/19 219/386 |
| 2013/0002994 A1* | 1/2013 | Wang | G02F 1/133502 349/96 |
| 2013/0105138 A1* | 5/2013 | Burchard | G05D 23/19 165/287 |
| 2016/0103358 A1* | 4/2016 | Tanaka | G06F 3/0412 349/12 |
| 2017/0090240 A1* | 3/2017 | Liu | G02F 1/13338 |
| 2017/0199600 A1* | 7/2017 | Shiojiri | G06F 3/044 |
| 2017/0277290 A1* | 9/2017 | Murakami | G06F 3/041 |
| 2017/0293382 A1* | 10/2017 | Ishii | G06F 3/041 |
| 2017/0293386 A1* | 10/2017 | Seder | G02F 1/132 |
| 2017/0363899 A1* | 12/2017 | Nakayama | G06F 3/041 |
| 2017/0371453 A1* | 12/2017 | Nakayama | G06F 3/041 |
| 2018/0018051 A1* | 1/2018 | Ogura | G06F 3/041 |
| 2018/0039129 A1* | 2/2018 | Liao | G02F 1/13338 |
| 2018/0074612 A1* | 3/2018 | Shiojiri | G06F 3/041 |
| 2018/0203279 A1* | 7/2018 | Zhou | G02F 1/13338 |

* cited by examiner

TOUCH DISPLAY DEVICE AND METHOD FOR MANUFACTURING THE SAME

CROSS-REFERENCE TO RELATED APPLICATIONS

The present application claims priority to Chinese Patent Application No. 201610632721.3, filed on Aug. 4, 2016, and entitled "touch display device and method for manufacturing the same", the entire contents thereof are incorporated herein by reference.

TECHNICAL FIELD

The present disclosure relates to the technical field of touch display, and more particularly to a touch display device and a method for manufacturing the same.

BACKGROUND

With the development of science and technology, display technology has developed dramatically. A liquid crystal display device has gradually replaced a traditional cathode tube ray display device, and has been widely used in an increasing number of areas. The liquid crystal display device has advantages such as being light weight, having low power consumption, and less radiation, and thus is widely used in notebook computers, mobile phones, digital cameras, display terminals, and other electronic equipment. A touch display device generated by touch technology combined with the liquid crystal display technology is an important milestone in the development of science and technology. The touch display device is used to display a variety of images and provide users with intuitive touch interfaces.

SUMMARY

An object of the present disclosure is to provide a touch display device and a method for manufacturing the same, so that the problems in related art that prevent the touch display device from working normally in a low temperature environment and cause it to suffer from external electromagnetic interference can be solved.

The object of the present disclosure is achieved by the following technical solutions.

Embodiments of the present disclosure provide a touch display device including a first substrate and a second substrate disposed to be opposite to each other, wherein a touch functional layer and a conductive layer are insulated from each other are disposed on the second substrate, the conductive layer is disposed between the touch function layer and the first substrate; and the conductive layer serves as a heating layer in a first state and serves as a shield layer in a second state.

In one embodiment, the conductive layer is used as a heating layer to heat the touch display device when an ambient temperature where the touch display device is located is lower than or equal to a first threshold and a temperature of the touch display device is lower than a second threshold; the conductive layer is used as a shield layer to shield the touch function layer from electromagnetic interference when the ambient temperature is higher than the first threshold, wherein the first threshold is less than the second threshold.

In one embodiment, the conductive layer and the touch functional layer are formed on the same side of the second substrate, and a conductive layer is disposed between the second substrate and the touch function layer; or the conductive layer is disposed on a side of the second substrate facing the first substrate, and the touch function layer is disposed on a side of the second substrate facing away from the first substrate.

In one embodiment, the conductive layer is a transparent conductive layer; or the conductive layer is a non-transparent conductive layer, and has a vertical projection on the second substrate which is coincident with a vertical projection of the black matrix on the second substrate.

In one embodiment, the touch display device further includes a control device electrically connected to the conductive layer and the touch function layer respectively; when the ambient temperature is lower than or equal to the first threshold and the temperature of the touch display device is lower than the second threshold, the control device controls the conductive layer to be applied with a voltage to heat the touch display device; and when the ambient temperature is higher than the first threshold, the control device controls the conductive layer to be grounded to shield the touch function layer from the electromagnetic interference.

In one embodiment, wherein the touch display device further includes a first temperature sensor provided outside the touch display device and a second temperature sensor provided inside the touch display device, and the control device is electrically connected to the first temperature sensor and the second temperature sensor respectively; and the first temperature sensor is used to monitor the ambient temperature, and the second temperature sensor is used to monitor the temperature of the touch display device.

In one embodiment, the control device is further used to control the conductive layer to stop heating the touch display device when the temperature of the touch display device is higher than a third threshold, wherein the third threshold is greater than the first threshold and is greater than the second threshold.

In one embodiment, the first threshold is less than the second threshold, and the second threshold is less than the third threshold.

In one embodiments, the first threshold is −10° C., the second threshold is 20° C., and the third threshold is 30° C.

Embodiments of the present disclosure also provide a manufacturing method for a touch display device, which is used to manufacture the above described touch display device, including:

providing the first substrate and the second substrate; and forming the touch functional layer and the conductive layer insulated from each other on the second substrate.

In one embodiment, the forming the touch functional layer and the conductive layer insulated from each other on the second substrate includes:

forming the conductive layer and the touch functional layer successively on the same side of the second substrate; or forming the conductive layer on a side of the second substrate facing the first substrate, and forming the touch function layer on a side of the second substrate facing away from the first substrate.

In one embodiment, when forming the conductive layer and the touch functional layer successively on the same side of the second substrate, forming the insulating layer on the conductive layer after forming the conductive layer and before forming the touch functional layer is formed.

DETAILED DESCRIPTION

Figure 1:
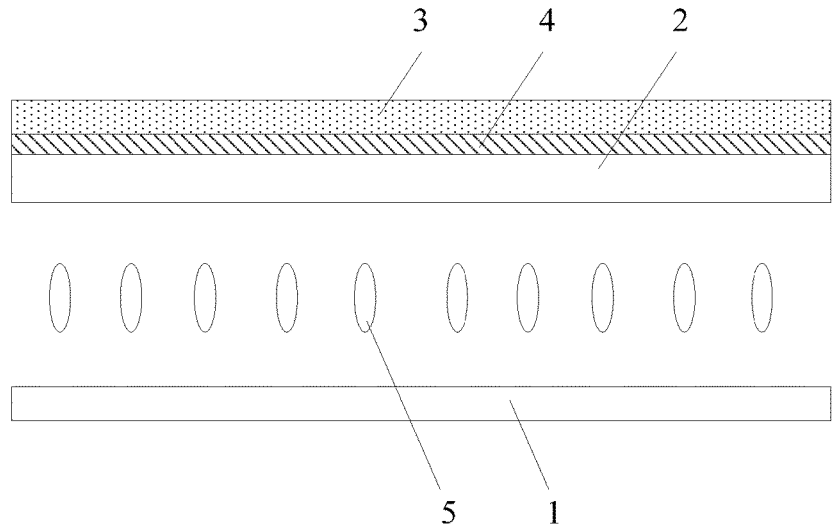
FIG. 1 is a schematic view showing a structure of a first touch display device provided by embodiments of the present disclosure.

The present disclosure will now be described in detail with reference to the accompanying drawings. It is to be noted that the same or similar reference numerals denote the same or like elements or elements having the same or similar functions throughout. The embodiments described below with reference to the accompanying drawings are exemplary and are for the purpose of explaining this disclosure only and are not to be construed as limiting the scope of the present disclosure.

Since the liquid crystal is a substance which is between solid and liquid, when the touch display device is used in an environment where the ambient temperature is lower than a certain temperature, for example, an ambient temperature of −20° C., the liquid crystal may change into a solid state and can not be reversed by an electric field. Moreover, in the ambient temperature below −30° C., the touch function of the touch display device will be affected. The temperature of the touch display device will also affect the display and touch function. For example, when the temperature of the touch display device is below 20° C., the touch display device may show abnormal displays. Therefore, in the related art, in the environment of −20° C. to −70° C., because the liquid crystal may be converted into a solid state and cannot be twisted by change of the electric fields, the touch display device cannot display normally. Moreover, in the environment of −30° C.~−70° C., the touch function of the touch display device cannot work due to failure.

In addition, the touch display device is also susceptible to electromagnetic interference. For example, when there is the electromagnetic interference, the signal of the touch electrode acquired by the touch display device is affected by an external magnetic field, so that the acquired touch signal is distorted, causing a reduced touch precision or failure.

Referring to FIG. 1, the present embodiment provides a touch display device including a first substrate 1 and a second substrate 2 disposed to be opposite to each other, the second substrate 2 being provided with a touch functional layer 3 and a conductive layer 4 insulated from each other. The conductive layer 4 is disposed between the touch function layer 3 and the first substrate 1. In a first state, the conductive layer 4 serves as a heating layer. In a second state, the conductive layer 4 serves as a shield layer.

In the present embodiment, the conductive layer 4 which serves as a heating layer in the first state and severs as a shield layer in the second state is provided in the touch display device, and thus, in low temperature environment, the conductive layer 4 can enter the first state to heat the touch display device, so that the touch display device can function properly. In addition, the conductive layer 4 can enter the second state when it is necessary to shield the touch function layer from electromagnetic interference.

Specifically, the conductive layer 4 is used as a heating layer to heat the touch display device when the ambient temperature where the touch display device is located is lower than or equal to a first threshold and the temperature of the touch display device is lower than a second threshold. The conductive layer 4 is used as a shield layer to shield the touch function layer 3 from the electromagnetic interference when the ambient temperature is higher than the first threshold, and the first threshold is less than the second threshold. Since the conductive layer 4 has its own resistance, when the conductive layer 4 is applied with a voltage, heat will be generated. Therefore, it is possible to heat the touch display device by using the conductive layer 4 as a heating layer.

For a liquid crystal cell formed by a first substrate 1 and a second substrate 2 in a cell assembly, a liquid crystal 5 is usually provided between the first substrate 1 and the second substrate 2. It is to be noted that if only improving the performance of the touch functional layer 3 in the low temperature environment is considered, the liquid crystal cell formed by the first substrate 1 and the second substrate 2 in a cell assembly according to the idea of the present disclosure may be modified to an organic electroluminescence diode display device, which will be not repeated here.

The first substrate 1 may be an array substrate, and the second substrate 2 may be an opposite substrate or a color film substrate, which will not be repeated here.

In the present embodiment, by providing the touch functional layer 3 and the conductive layer 4 insulated from each other on the second substrate 2, when the ambient temperature is lower than or equal to a predetermined first threshold and the temperature of the touch display device is lower than the second threshold, the conductive layer 4 is capable of heating the liquid crystal cell (formed by the second substrate 2 and the first substrate 1 in a cell assembly) and the touch functional layer 3 of the touch display device, so that the display device can display normally, and the touch function layer 3 can also operate normally. Therefore, the object that the touch display device operates normally in a low temperature environment can be achieved. In addition, the conductive layer 4 can also be used as a shield layer to shield the touch function layer 3 from the electromagnetic interference to ensure that the touch function layer 3 operates normally.

It is to be noted that the conductive layer 4 and the touch functional layer 3 are disposed on the same side of the second substrate 2 and between the second substrate 2 and the touch functional layer 3. Alternatively, the conductive layer 4 is disposed between a side of the second substrate 2 facing the first substrate 1, and the touch function layer 3 is disposed on a side of the second substrate 2 facing away from the first substrate 1. That is, the conductive layer 4 may be provided between the second substrate 2 and the touch functional layer 3 as necessary, or the conductive layer 4 may be provided on a side of the second substrate 2 facing the first substrate 1. In accordance with the actual design requirements, the conductive layer 4 may be formed by a transparent conductive material, to obtain a transparent conductive layer. The conductive layer 4 may also be formed by a non-transparent conductive material. In view of maximizing the aperture ratio, the vertical projections of the non-transparent conductive layer 4 and the black matrix on the second substrate 2 can be coincident with each other, which will not be repeated here.

Figure 2:
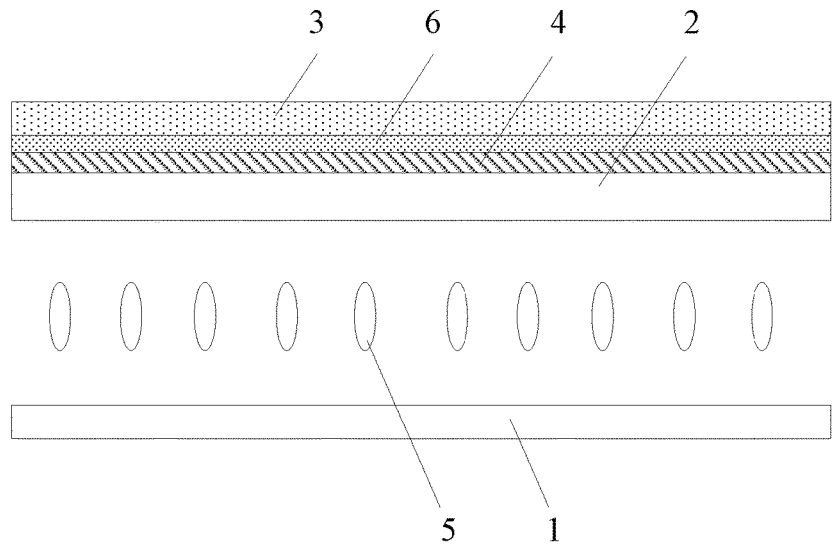
FIG. 2 is a schematic view showing a structure of a second touch display device provided by embodiments of the present disclosure.

In one embodiment, as shown in FIG. 2, when the conductive layer 4 is disposed between the second substrate 2 and the touch functional layer 3, in order to avoid a short circuit between the touch functional layer 3 and the conductive layer 4, a transparent insulating layer 6 may be provided between the touch functional layers 3 and the conductive layers 4.

In order to realize the switching between the heating function and the function of shielding the electromagnetic interference of the conductive layer 4, the touch display device may include a control element. The ambient temperature can be obtained by methods of using network by wireless means or by SMS, for example, by a router in an office or a home. According to the ambient temperature and the temperature of the touch display device acquired by the above described methods, the control element realizes the starting and stopping of the heating function, and the switching between the heating function and the function of shielding the electromagnetic interference. The details are as follows.

Figure 3:
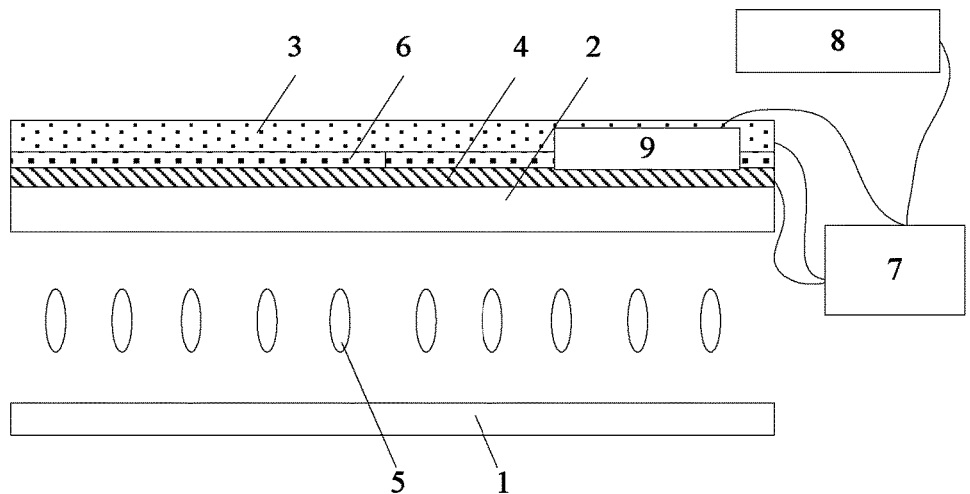
FIG. 3 is a schematic view showing a structure of a third touch display device provided by embodiments of the present disclosure.

Referring to FIG. 3, the touch display device includes a first substrate 1 and a second substrate 2 disposed to be opposite to each other. A touch function layer 3 is disposed on a side of the second substrate 2 facing away from the first substrate 1. A conductive layer 4 is disposed between the second substrate 2 and the touch function layer 3. A transparent insulating layer 6 is provided between the touch functional layer 3 and the conductive layer 4. The touch display device further includes a control device 7, a first temperature sensor 8 and a second temperature sensor 9. The control device 7 is electrically connected to the touch function layer 3, the conductive layer 4, the first temperature sensor 8 and the second temperature sensor 9. The first temperature sensor 8 is used to monitor the ambient temperature, and the second temperature sensor 9 is used to monitor the temperature of the touch display device.

When the ambient temperature is lower than or equal to the first threshold and the temperature of the touch display device is lower than the second threshold, the control device 7 controls the conductive layer 4 to be applied with a voltage from a power supply to heat the touch display device. When the ambient temperature is higher than the first threshold, the control device 7 controls the conductive layer 4 to be grounded to shield the touch function layer 3 from the electromagnetic interference. In this embodiment, the control device 7 may be a central processing unit or a single chip microcomputer, or may be a circuit board including a central processing unit or a single chip microcomputer, which will not be repeated here.

It is to be noted that in the present embodiment, the control device 7 controls the conductive layer 4 to be grounded, which is based on that the control device 7 is electrically connected with the touch function layer 3. That is, the control device 7 is electrically connected with a ground power supply layer of the touch function layer 3. When it is necessary to switch the function of the conductive layer 4, the control device 7 controls the conductive layer 4 to be electrically connected with the ground power supply layer of the touch function layer 3. It should be appreciated that the control device 7 may not be electrically connected with the ground power supply layer of the touch functional layer 3 but electrically connected to other ground power source layers. The conductive layer 4 can be switched to connect with other ground power source layers, thus the effect of shielding the touch function layer 3 from the electromagnetic interference can also be achieved, which will not be repeated here.

In the present embodiment, the control device 7 is capable of controlling the conductive layer 4 to be switched between the heating function and the function of shielding the electromagnetic interference, so that the touch display device can be operated normally when the ambient temperature is lower than or equal to the first threshold and the temperature of the touch display device is lower than the second threshold, and the stability of the touch function of the touch function layer 3 can also be ensured by the conductive layer 4 shielding the electromagnetic interference when the ambient temperature is higher than the first threshold. In addition, a more accurate temperature monitoring can be achieved by the first temperature sensor 8 monitoring the ambient temperature and the second temperature sensor 9 monitoring the temperature of the touch display device.

It should be noted that the first temperature sensor 8 may be omitted, and then the control device 7 of the touch display device can acquire the ambient temperature through wireless network.

In order to prevent the adverse effect of an excessively high temperature on the touch display device, the control device 7 also serves to control the conductive layer 4 to stop heating the touch display device when the temperature of the touch display device is higher than the third threshold, wherein the third threshold is greater than the first threshold and is greater than the second threshold. In the present embodiment, the control device 7 can stop heating when the temperature of the touch display device is higher than the third threshold, and prevent the touch display device from being adversely affected by the excessively high temperature.

In the above described touch display device, the ambient temperature and the temperature of the touch display device based on which the conductive layer 4 starts or stops heating or enters the mode of shielding the electromagnetic interference are described below.

The first threshold is less than the second threshold and the second threshold is less than the third threshold, wherein the first threshold is set to −10° C., the second threshold is 20° C., and the third threshold is 30° C. Other temperatures can also be set based on the actual requirements, which will not be repeated here.

The advantages of the present embodiment are as follows. By providing a conductive layer which serves as a heating layer in the first state and severs as a shield layer in the second state in the touch display device, in low temperature environment, the conductive layer can enter the first state to heat the touch display device, so that the touch display device can function properly. In addition, the conductive layer can enter the second state when it is necessary to shield the touch function layer from an electromagnetic interference.

Figure 4:
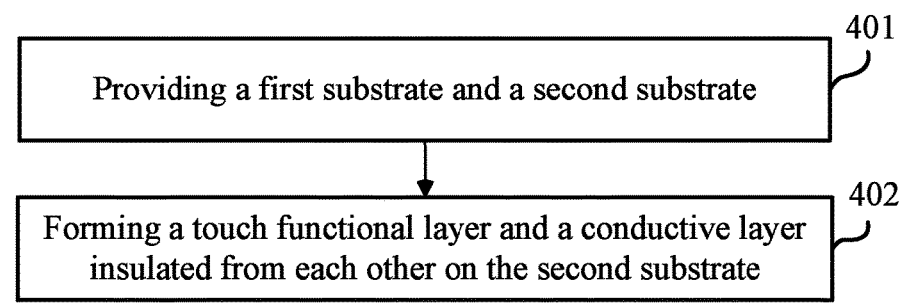
FIG. 4 is a flow chart of a method for manufacturing a touch display device provided by embodiments of the present disclosure.

Referring to FIG. 4, the present embodiment also provides a method for manufacturing a touch display device, which is used to prepare a touch display device of the above embodiment, including the follow steps.

Step 401, a first substrate and a second substrate are provided.

Step 402, a touch functional layer and a conductive layer which are insulated from each other are formed on the second substrate. The conductive layer serves as a heating layer in a first state and serves as a shielding layer in a second state.

In the step 402, when the touch functional layer and the conductive layer are formed, the following structure can be performed.

A conductive layer and a touch functional layer are successively formed on the same side of the second substrate; or a conductive layer is formed on a side of the second substrate facing the first substrate, and a touch function layer is formed on a side of the second substrate facing away from the first substrate.

In one embodiment, the touch functional layer and the conductive layer are provided on the same side of the second substrate, an insulating layer is formed on the conductive layer after the conductive layer is formed and before the touch functional layer is formed.

A control device, a first temperature sensor and a second temperature sensor can also be provided, to electrically connect the control device to the touch function layer, the transparent electrode layer, the first temperature sensor and the second temperature sensor, respectively. Specifically, the first temperature sensor may be provided on either of outer sides of the touch display device or a flexible circuit board. The second temperature sensor may be provided within the touch display device, for example, provided on the first substrate or the second substrate. The second temperature sensor can also be provided on the touch function layer, and will not repeat here.

The advantages of the present embodiment are as follows. By providing a conductive layer which serves as a heating layer in the first state and severs as a shield layer in the second state in the touch display device, when the ambient temperature is low, the conductive layer can heat the liquid crystal cell (formed by the first substrate and the second substrate in cell assembly) of the touch display device, so that the display device can display normally while the touch function lay can operate normally, thus the touch display device work normally in low temperature environment. In addition, the conductive layer can also enter the second state to shield the touch function lay from the electromagnetic interference.

The above described contents are merely exemplary embodiments of the present disclosure, and it will be apparent to those skilled in the art that certain alterations and modifications may be made without departing from the principles of the present disclosure. If these alterations and modifications are within the scope of the present disclosure and the equivalents thereof, it is intended that such alterations and modifications are included in the present disclosure.

What is claimed is:

1. A touch display device comprising:
   a first substrate and a second substrate disposed opposite to each other;
   wherein a touch functional layer and a conductive layer are insulated from each other and are disposed on the second substrate, the conductive layer is disposed between the touch function layer and the first substrate; and the conductive layer is configured as a heating layer in a first state and is configured as a shield layer in a second state;
   a control device electrically connected to the conductive layer and the touch function layer respectively;
   a first temperature sensor provided outside the touch display device and a second temperature sensor provided inside the touch display device, the control device being electrically connected to the first temperature sensor and the second temperature sensor respectively;
   the first temperature sensor being configured to monitor an ambient temperature, and the second temperature sensor being configured to monitor a temperature of the touch display device;
   the control device being configured such that when the ambient temperature is lower than or equal to a first threshold and the temperature of the touch display device is lower than a second threshold, the control device controls the conductive layer to be applied with a voltage to heat the touch display device; and when the ambient temperature is higher than the first threshold, the control device controls the conductive layer to be grounded to shield the touch function layer from electromagnetic interference.

2. The touch display device of claim 1, wherein the conductive layer is configured as a heating layer to heat the touch display device when an ambient temperature is lower than or equal to the first threshold and a temperature of the touch display device is lower than the second threshold; and the conductive layer is configured as a shield layer to shield the touch function layer from electromagnetic interference when the ambient temperature is higher than the first threshold, the first threshold being less than the second threshold.

3. The touch display device of claim 1, wherein the conductive layer and the touch functional layer are formed on a same side of the second substrate, and a conductive layer is disposed between the second substrate and the touch function layer.

4. The touch display device of claim 2, wherein the conductive layer and the touch functional layer are formed on a same side of the second substrate, and a conductive layer is disposed between the second substrate and the touch function layer.

5. The touch display device of claim 1, wherein the conductive layer is disposed on a side of the second substrate facing the first substrate, and the touch function layer is disposed on a side of the second substrate facing away from the first substrate.

6. The touch display device of claim 2, wherein the conductive layer is disposed on a side of the second substrate facing the first substrate, and the touch function layer is disposed on a side of the second substrate facing away from the first substrate.

7. The touch display device of claim 3, wherein the conductive layer is a transparent conductive layer.

8. The touch display device of claim 3, wherein the conductive layer is a non-transparent conductive layer and has a vertical projection on the second substrate which is coincident with a vertical projection of the black matrix on the second substrate.

9. The touch display device of claim 2, wherein the touch display device further comprises a control device electrically connected to the conductive layer and the touch function layer respectively;
   when the ambient temperature is lower than or equal to the first threshold and the temperature of the touch display device is lower than the second threshold, the control device controls the conductive layer to be applied with a voltage to heat the touch display device; and when the ambient temperature is higher than the first threshold, the control device controls the conductive layer to be grounded to shield the touch function layer from the electromagnetic interference.

10. The touch display device of claim 1, wherein the control device is further configured to control the conductive layer to stop heating the touch display device when the temperature of the touch display device is higher than a third threshold, wherein the third threshold is greater than the first threshold and is greater than the second threshold.

11. The touch display device of claim 10, wherein the first threshold is less than the second threshold; and the second threshold is less than the third threshold.

12. The touch display device of claim 11, wherein the first threshold is −10° C., the second threshold is 20° C., and the third threshold is 30° C.

13. A manufacturing method for a touch display device comprising:
- providing the touch display device having a first substrate and a second substrate disposed opposite each other; and
- forming a touch functional layer and a conductive layer on the second substrate, wherein the touch functional layer and the conductive layer are insulated from each other;
- wherein a touch functional layer and a conductive layer are disposed on the second substrate, the conductive layer is disposed between the touch functional layer and the first substrate; and the conductive layer is configured as a heating layer in a first state and is configured as a shield layer in a second state;
- providing a control device electrically connected to the conductive layer and the touch function layer respectively;
- providing a first temperature sensor outside the touch display device and a second temperature sensor inside the touch display device, and the control device is electrically connected to the first temperature sensor and the second temperature sensor respectively;
- configuring the first temperature sensor to monitor the ambient temperature, and configuring the second temperature sensor to monitor the temperature of the touch display device;
- configuring the control device such that when the ambient temperature is lower than or equal to a first threshold and the temperature of the touch display device is lower than a second threshold, the control device controls the conductive layer to be applied with a voltage to heat the touch display device; and when the ambient temperature is higher than the first threshold, the control device controls the conductive layer to be grounded to shield the touch function layer from electromagnetic interference.

14. The manufacturing method of claim 13, wherein the forming the touch functional layer and a conductive layer insulated from each other on the second substrate comprises:
- forming the conductive layer and the touch functional layer successively on a same side of the second substrate.

15. The manufacturing method of claim 13, wherein the forming the touch functional layer and a conductive layer insulated from each other on the second substrate comprises:
- forming the conductive layer on a side of the second substrate facing the first substrate, and forming the touch function layer on a side of the second substrate facing away from the first substrate.

16. The manufacturing method of claim 14, wherein the forming the conductive layer and the touch functional layer successively on a same side of the second substrate comprises forming the conductive layer, forming an insulating layer on the conductive layer and forming the touch functional layer.

* * * * *